United States Patent Office 3,225,360
Patented Dec. 28, 1965

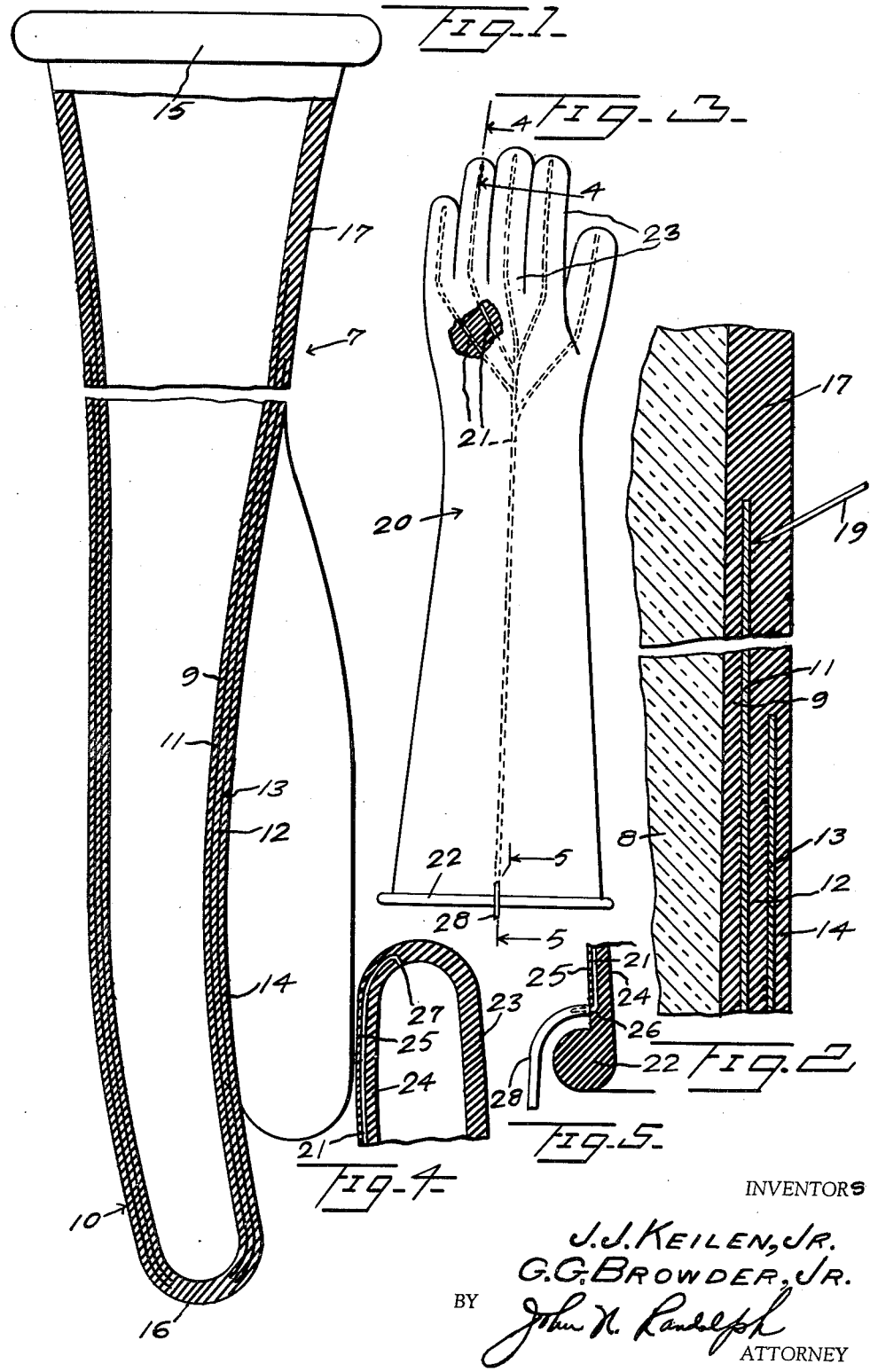

3,225,360
SEAMLESS ARTICLE
John J. Keilen, Jr., Charleston, and George G. Browder, Jr., Charleston Heights, S.C., assignors to Charleston Rubber Company, Charleston, S.C., a corporation of Ohio
Filed Jan. 26, 1962, Ser. No. 168,951
8 Claims. (Cl. 2—167)

This invention relates to a novel seamless elastomeric article of irregular shape and to a novel process or method of producing such an article whereby the article will possess a much greater flexibility in ratio to its thickness than is possible with similar types of articles previously produced by known methods.

More particularly, it is a primary object of the present invention to provide a process or method by means of which a novel seamless elastomeric article of irregular shape, such as a glove, can be produced in sufficient thickness to provide barriers as between two different atmospheres or against harmful materials, and yet possess much greater flexibility and dexterity than similar articles of the same thickness, previously produced.

More particularly, it is an aim of the invention to provide a novel seamless article of multi-layer construction resulting from a novel process or method, so that the resulting article will possess the barrier properties of a thick layer of rubber or other elastomer, together with the flexibility and dexterity previously only available in much thinner articles.

Still a further object of the invention is to provide a method of obtaining close conformity between the layers of the multi-layer article so that trapped air, wrinkles or both will not occur and which would greatly minimize tactility of the article.

Still another object of the invention is to provide means for producing a novel elastomeric article, a part or parts of which are composed of a plurality of superposed layers while other part or parts, of approximately the same thickness, are composed of a single layer.

Still a further object of the invention is to provide a novel method whereby the separated layers of the article will be capable of sliding freely relative to one another to enhance the flexibility and dexterity of the article.

Still another object of the invention is to provide a novel article which, due to its multi-layer construction, readily adapts itself for use in affording heat or cold insulation and which is likewise well adapted for use as a liner for a nonelastic overgarment, and to which liner compressed air can be supplied to achieve a desired pressure against a part of the body encased by the liner to protect the user at high altitudes and under other conditions of low absolute pressure.

Various other objects and advantages of the invention will hereinafter become more fully apparent from the following description of the drawing, illustrating presently preferred embodiments thereof, and wherein:

FIGURE 1 is a longitudinal sectional view, partly in side elevation and partly broken away, disclosing one embodiment of the novel elastomeric article;

FIGURE 2 is a fragmentary longitudinal sectional view of a part of the article of FIGURE 1 and a part of the mold on which it is formed, illustrating one method of producing the article;

FIGURE 3 is a plan view, partly broken away and on a reduced scale relative to FIGURE 1, illustrating a different embodiment of the article, and FIGURES 4 and 5 are enlarged fragmentary longitudinal sectional views taken substantially along the lines 4—4 and 5—5, respectively, of FIGURE 3.

Referring more specifically to the drawing, FIGURE 1 illustrates a rubber or elastomeric glove, designated generally 7, constituting one type of irregularly shaped article partly of multi-layer construction capable of being produced by the novel method.

The article 7 is produced by dipping a mold, such as a porcelain mold 8, in a conventional compounded latex (elastomer dispersion) or a conventional solvent cement (elastomer solution). The former may be composed of latex, either synthetic or natural, to which has been added the usual modifying, vulcanizing, and accelerating ingredients. The latter may be composed of rubber, either synthetic or natural, which has been previously broken down on a two roll or other rubber mill and which is thoroughly blended with compounding ingredients such as pigments, protective agents and curing agents and which is then mixed with a proper amount of solvent to produce a complete solution of the soluble portions of the blend.

The porcelain form 8, having the correct design to produce the article 7 of the desired size and shape, is then dipped into an open tank containing the aforementioned latex or cement and withdrawn therefrom. In the case of a latex, the form may first be dipped in a suitable coagulant. The wet film adhering to the form is allowed to dry due to evaporation of the solvent or to gel from action of the coagulant, and these operations are repeated until a layer 9 of a desired thickness is produced. As is conventional, the form 8 is always dipped so that the end thereof, on which the fingers 10 of the article 7 are produced, is down, and the successive films are dried with the form inverted for drying alternate films. After the layer 9 has thus been produced and dried, and which layer is of uniform thickness from end-to-end of the article 7 and possesses no separation or demarcation discernible between the successively applied films, the form 8 containing thereon the layer 9 is then dipped part way into a solution constituting a film forming, nonadhering separating medium which is substantially impervious to the elastomer of the dispersion or of the first mentioned solution. This film 11 of the separating medium is only of a thickness of several thousandths of an inch.

The separating medium resulting in the film 11 is a substance which is either insoluble or slowly soluble in the water of the latex or the solvent of the first mentioned solution or rubber cement and which possesses a low adhesion to the polymer or elastomer thereof. Thus, depending upon the polymer or elastomer, the separating medium may be a polyester resin, a nylon resin, or a silicone resin, or may comprise polyvinyl alcohol, polyvinyl acetate, carboxymethyl cellulose, ethyl cellulose, methyl cellulose, various polyethylene oxide derivatives, as well as numerous other materials. Such materials form a continuous film which readily distinguishes from a powder which, if applied to a part of the outer surface of the layer 9, would work into the rubber and result in nothing more than another dispersed pigment. The material of the separating medium must additionally possess the characteristic of flexibility so that it will not minimize the flexibility of the layer 9.

After the separating film 11 has dried with the finger end of said layer 9 in a lowermost position, the form 8 is dipped a plurality of times, in the aforedescribed manner, in the elastomer dispersion or cement to produce a layer 12, which is separated from the layer 9 by the film 11, to the depth of said film 11, and which, therebeyond or thereabove, is integral with and forms a part of the layer 9, as seen in FIGURES 1 and 2. The separating medium of which the film 11 is formed must be capable of not dissolving before the elastomeric film applied thereover has set.

After the layer 12 has dried, the form containing the layers 9 and 12 is again dipped into the solution of the separating medium, but to a lesser extent than on the previous dip, to form a second film of separating medium 13 which may terminate below or nearer the finger tips of the article 7 than the film 11.

After drying of the film 13, dipping in the rubber latex or cement, draining and drying is repeated to form a third outer layer 14, which is separated from the layer 12 below the top of the film 13, which is integral with the layer 12 between the upper extremities of the films 11 and 13, and which is integral with both layers 9 and 12 above the upper extremity of the inner film 11, so that the article 7 between the upper extremity of the film 11 and the cuff 15 of the article constitutes one unbroken layer 17 having a thickness approximately equal to the combined thicknesses of the layer 9, 12 and 14, below the upper extremity of the film 13. Preferably, after dipping of each of the films 11 and 13, and before drying thereof, the separating agent is wiped or otherwise removed from the lower ends of the layers 9 and 12, so that the layers 9, 12 and 14 will also provide one continuous uninterrupted layer 16 at the tip of each finger 10, corresponding in thickness to the layer 17. After drying of the outer layer 14, the glove or article 7 is finished by cutting, rolling the bead 15, and curing by a conventional method.

The layers 9, 12 and 14 are then separated, either before or after removal of the article 7 from the form 8, by inserting a hollow needle 19 through the double thickness layer and into the film 11, as seen in FIGURE 2. Compressed air from a suitable source, not shown, is injected by the needle 19 into the space between the layers 9 and 12 for separating said layers throughout the area of the film 11, after which the air is extracted from between said layers. The same operation is repeated for separating the layers 12 and 14 by inserting the needle 19 through the layer 14 into the film 13. The article 7 will then resume its shape with the layer 12 disposed in close proximity to the layers 9 and 14 but no longer being adhered thereto.

The non-adhering characteristics of the films 11 and 13 will cause the layers 9, 12 and 14 to slide freely relative to one another so that portions of the glove in which the films 11 and 13 are located will possess a high degree of flexibility, far greater than the flexibility of the single triple thickness layers 16 and 17. It will be noted that the three-layer area extends from the finger tips to adjacent the wrist area of the glove and the two layer area extends therebeyond into a part of the cuff, so that the fingers and hand will have maximum flexibility or dexterity while at least a part of the cuff will be stiff. The flexibility of the two layer portion is several times greater than the flexibility of the portion 17, while the flexibility of the three layer portion of the glove is more than twice as great as that of the two layer portion. The single layer finger tip portions 16 are provided to prevent separation of the layers during removal of the glove from the hand and which would otherwise tend to occur if the glove had a tight fit on the hand.

It will also be readily apparent that the films 11 and 13 may be applied in other ways than by dipping, as by brushing or spraying the separating medium on the layers 9 and 12 and which may include masking the parts of said layers not to be coated with the separating medium. It will also be apparent that the patterns of the films or coatings of the separating medium will vary depending upon the article being manufactured and that the present invention is not limited to a three layer article.

Other methods may be utilized for separating the rubber layers, as by incorporating a gas forming substance in the separating medium. Such substances, known to the rubber industry as "blowing agents," retain their solid state up to a given temperature, then decompose to form a gas which will have the same separating affect as the injected air. A blowing agent is selected which decomposes at a temperature above that utilized for curing the article 7, so that after curing the temperature is raised sufficiently to activate the blowing agent to create the gas. After separation is accomplished by inflation resulting from the generation of the gas, the layers are punctured to permit escape of the gas and to enable the layers of rubber to assume their normal positions in proximity to one another. Sodium bicarbonate or any one of a number of organic materials such as urea or azodicarbonamide may be utilized as the blowing agent. Sodium bicarbonate decomposes at 518° F. which is substantially above the curing temperature of the article.

In lieu of the separating medium drying as a flexible film, the flexibility requirement may be met by utilizing a substance, such as shellac, which will result in a very friable film which will disintegrate into a powder when the article is flexed. This powder may be of the rolling type which will minimize friction between the separated layers.

It will also be readily apparent that the article 7 may be partially lead-loaded by dipping the form 8 a number of times in a rubber cement containing a lead compound, as disclosed by co-pending application entitled Seamless Article, Serial No. 792,540 filed February 11, 1959, now U.S. Patent No. 3,025,403, so that one or more of the layers will include lead-loaded films.

The layers 9, 12 and 14 may extend over greater areas of the glove 7 and after separation of the layers sufficient air may be left sealed or resealed between the layers to provide good heat and cold insulation.

The glove having the layers extended, as aforementioned, may also be utilized as a liner for a nonelastic glove, not shown, formed of leather or other suitable nonelastic material, and the spaces between the layers may then be pressurized with air to thereby exert pressure against the body part encased by the glove liner without having the air in direct contact with the body. Such a glove liner or other outer garment liner can be advantageously utilized at high altitudes or elsewhere under low absolute pressure conditions.

Also, where heat and cold insulation is of primary importance and tactility or dexterity is secondary, foam or foamable substances or other insulators may be placed between the layers and films to provide a more permanent barrier to the passage of heat or cold.

FIGURES 3, 4 and 5 illustrate another glove 20 which differs from the glove or article 7 in that the coating 21 is applied to the back of the glove in the pattern as shown in FIGURE 3 from adjacent the cuff bead 22 to near the tip of each thumb and finger stall 23, this coating being formed of the separating material and being interposed between an inner layer 24 and an outer layer 25 of rubber. The outer layer 25 is punctured externally near the cuff 22 to form a port 26 which communicates with an end of the coating 21 and the finger and thumb stalls are punctured internally through the inner layer 24 to communicate with the portions of the coating 21 which extend along each finger and thumb to provide discharge ports 27. A discharge end of a hose or other conduit 28 is connected to the inlet 26 for supplying either warm or cool air from a suitable source, not shown, which air converts the coating into passages through which the air flows and is discharged into the glove through the ports 27 at the finger tips, for warming or cooling the hand encased by the glove, depending upon the conditions under which the glove is used.

Various other modifications and changes are contemplated and may be resorted to, without departing from the function or scope of the invention as hereinafter defined by the appended claims.

We claim as our invention:

1. A seamless irregularly shaped article, such as a glove, composed of at least two layers each comprising a plurality of closely adhering superimposed films of an elastomer dispersion, said layers including like portions, and means confined between said portions of the layers and providing a lubricant to facilitate slippage of said portions of the layers relative to one another.

2. A seamless irregularly shaped article, such as a glove, composed of a plurality of superimposed films of an elastomer solution, said article being of substantially uniform thickness throughout, and said films including at least one portion composed of at least two separated layers and another portion consisting of a single integral layer.

3. A seamless irregularly shaped article as in claim 2, and means interposed between the layers of said first mentioned portion to facilitate slippage of the layers relative to one another to increase the flexibility of said portion relative to the single layer portion.

4. A seamless irregularly shaped article, such as a glove, of substantially uniform thickness and formed of a plurality of superimposed films of an elastomer dispersion, and said films including at least one area consisting of a single layer and a second area comprising two closely conforming separated layers, said separated layers being readily slidable relative to one another whereby said two layer area is more flexible than the single layer area.

5. A seamless irregularly shaped article as in claim 4, said article including a third area composed of three closely conforming separated layers capable of free sliding movement relative to one another and possessing greater flexibility than said two layer area.

6. A seamless irregularly shaped article, such as a glove, of substantially uniform thickness throughout and composed of a plurality of superimposed films of an elastomer solution, and means confined between certain of the films for increasing the flexibility of an area of the article in which said means is disposed relative to another area of the article.

7. A seamless irregularly shaped article, such as a glove, composed of a plurality of superimposed films of an elastomer dispersion including a part composed of a single layer of said films and another part composed of two separated layers defining a chamber therebetween, and means for inflating said chamber.

8. A seamless irregularly shaped article, such as a glove, composed of a plurality of closely adhering superimposed films of an elastomer solution, a coating of a separating medium interposed between certain of said films, said article having a passage formed therein located between said films and opening internally of the article and externally of the article at spaced points.

References Cited by the Examiner
UNITED STATES PATENTS

| | | | |
|---|---|---|---|
| 1,287,429 | 12/1918 | Price | 156—289 X |
| 1,534,208 | 4/1925 | Gibson | 2—168 X |
| 1,585,040 | 5/1926 | McDonald | 36—4 |
| 1,625,810 | 4/1927 | Krichbaum | 156—289 X |
| 2,451,758 | 10/1948 | Malm | 2—168 |
| 2,582,648 | 1/1952 | Mowbray | 36—8.1 |
| 2,621,333 | 12/1952 | Thomas et al. | 2—168 |
| 2,635,240 | 4/1953 | Tausch | 2—168 |
| 2,683,263 | 7/1954 | Lenhart | 2—168 |
| 2,747,229 | 5/1956 | Teague | 18—58.5 |
| 2,748,048 | 5/1956 | Russell | 156—289 X |
| 2,838,759 | 6/1958 | Tassie | 2—167 |
| 2,842,771 | 7/1958 | Foti | 2—159 |
| 2,873,450 | 2/1959 | Brodeur | 2—167 |
| 2,903,706 | 9/1959 | Alberts et al. | 2—215 |
| 2,941,257 | 6/1960 | Davis | 18—58.5 |
| 3,103,016 | 9/1963 | Perlman | 2—270 |
| 3,110,035 | 11/1963 | La Hue | 2—168 |
| 3,121,877 | 2/1964 | Ginter | 2—159 |

JORDAN FRANKLIN, *Primary Examiner.*

EARL M. BERGENT, DAVID J. WILLIAMOWSKY,
*Examiners.*

H. F. EPSTEIN, G. V. LARKIN, *Assistant Examiners.*